US010749896B2

(12) United States Patent
Gadot

(10) Patent No.: US 10,749,896 B2
(45) Date of Patent: Aug. 18, 2020

(54) METHOD AND SYSTEM FOR DETERMINING A READINESS OF A COMPUTER NETWORK OF AN ORGANIZATION TO DENIAL OF SERVICE (DOS) ATTACKS

(71) Applicant: Red Button Ltd., Tel Aviv (IL)

(72) Inventor: Ziv Gadot, Tel Aviv (IL)

(73) Assignee: RED BUTTON LTD., Tel Aviv (IL)

( * ) Notice: Subject to any disclaimer, the term of this patent is extended or adjusted under 35 U.S.C. 154(b) by 277 days.

(21) Appl. No.: 15/585,248

(22) Filed: May 3, 2017

(65) Prior Publication Data
US 2018/0324210 A1 Nov. 8, 2018

(51) Int. Cl.
*H04L 29/06* (2006.01)

(52) U.S. Cl.
CPC ...... *H04L 63/1458* (2013.01); *H04L 63/1433* (2013.01)

(58) Field of Classification Search
CPC .................. H04L 63/1458; H04L 63/1433
USPC ........................................... 716/25
See application file for complete search history.

(56) References Cited

U.S. PATENT DOCUMENTS

| 7,669,239 | B2* | 2/2010 | Dickelman | H04L 63/123 713/166 |
| 2005/0039057 | A1* | 2/2005 | Bagga | G06F 21/40 726/19 |
| 2005/0166049 | A1* | 7/2005 | Touitou | H04L 63/08 713/170 |
| 2013/0104236 | A1* | 4/2013 | Ray | H04L 63/1433 726/25 |
| 2015/0033348 | A1* | 1/2015 | Oliphant | G06F 21/57 726/25 |
| 2018/0268309 | A1* | 9/2018 | Childress | G06N 99/005 |

* cited by examiner

*Primary Examiner* — Jahangir Kabir
(74) *Attorney, Agent, or Firm* — Pearl Cohen Zedek Latzer Baratz LLP

(57) ABSTRACT

A method, a system, and a computer readable medium for determining a readiness of a computerized network against distributed denial of service (DDoS) attacks are provided herein. The system may include: an interface configured to obtain properties characterizing the computerized network; a knowledge base containing a plurality of rules taking into account DDoS risks and best practice related thereto; and a computer processor configured to: analyze the properties using the knowledge base to yield an analysis; and determine a readiness of the computerized network against DDoS attacks, based on the analysis. In some embodiments, the properties are obtained by analyzing a filled-in questionnaire relating to the computerized network under test. In other embodiments, these properties are automatically derived from databases containing data pertaining to the computerized network.

19 Claims, 13 Drawing Sheets

| Q01 Services the organization poses including capacity |
|---|
| Q02 Services location (data center or cloud) |
| Q03 Internet pipe size |
| Q04 Network elements, vendor, capacity and mitigation prosperities |
| Q05 Configuration actions |
| Q06 Human capacities (education, training) |
| Q07 Risk factors (country, vertical) |

METHOD AND SYSTEM FOR DETERMINING A READINESS OF A COMPUTER NETWORK OF AN ORGANIZATION TO DENIAL OF SERVICE (DOS) ATTACKS

FIELD OF THE INVENTION

The present invention relates generally to the field of computerized decision support systems, and more particularly to such systems for determining a readiness of a computerized system against distributed denial of service (DDoS) attacks.

BACKGROUND OF THE INVENTION

Prior to the background of the invention being set forth, it may be helpful to set forth definitions of certain terms that will be used hereinafter.

The term "denial of service" or "DoS", and more particularly "distributed denial of service" or "DDoS", as used herein refers to a cyber-attack where the perpetrator seeks to make a machine or network resource unavailable to its intended users by temporarily or indefinitely disrupting services of a host connected to the Internet. Denial of service is typically accomplished by flooding the targeted machine or resource with superfluous requests in an attempt to overload systems and prevent some or all legitimate requests from being fulfilled.

The terms "network element" or "services and network elements" as used herein refer broadly to facility or equipment used in the provision of a telecommunications service and can thus refer to elements in charge of network security but also to network elements which are not related to network security. The type of network element or a service may include any of the following entities: Web service; Web socket service; Domain Name System (DNS) service; Cloud Access Control List (ACL); Firewall; Web Application Firewall (WAF); DDoS mitigation appliance; Internet Service Provider (ISP)-based DDoS protection; Cloud-based DDoS Protection (which is DNS based); Cloud based DDoS Protection being Border gateway Protocol (BGP) based; Content Distribution Network (CDN); router; and an Internet pipe.

The term "decision support system" or "DSS" as used herein is defined herein as a computer-based information system that supports business or organizational decision-making activities, typically resulting in ranking, sorting or choosing from among alternatives. DSSs serve the management, operations, and planning levels of an organization (usually mid and higher management) and help people make decisions about problems that may be rapidly changing and not easily specified in advance—i.e., Unstructured and Semi-Structured decision problems. Decision support systems can be either fully computerized, human-powered or a combination of both.

One challenge of determining a readiness of a computer network of an organization against DDoS attacks is that many organizations are reluctant to provide full access to their network in order to carry out an analysis that check readiness against DDoS attacks by interfacing into their actual network.

Yet another challenge which is even more important is the ability, or more particularly, lack thereof, of running an actual "live" DDoS testing, also known as DDoS Penetration Testing or DDoS Simulation Testing.

It would be therefore advantageous to be able to reach a conclusion or get some insight regarding the readiness of a specific computer network against DDoS attacks without actually accessing and simulating an attack against the computer network itself.

SUMMARY OF THE INVENTION

In order to overcome the drawbacks of currently available DDoS readiness analysis tools that require full risky physical access to the organizations network, it is suggested herein to deduce the architecture and security measurements via a questionnaire and then use best practice rules to determine the level of readiness.

In accordance with some embodiments of the present invention, a method and a system for determining a readiness of a computerized network against DDoS attacks are provided herein. The method may include the following steps: obtaining responses to a questionnaire including one or more questions directed to properties characterizing the computerized network; analyzing the responses using a knowledge base containing a plurality of rules taking into account DDoS risks and best practice; and determining a readiness of the computerized network against DDoS attacks, based on the analysis.

In accordance with some embodiments of the present invention, it is suggested to provide a so-called 'DDoS Resiliency Score Expert System' (DRSES) decision support system for assisting an organization to estimate its resiliency score against DDoS attacks using a so-called white-box approach. In a white box approach, some embodiments of the present invention deduce the architecture and the features of the system under test. The DRSES receives as input information regarding organization services, network structure and mitigation practices. It then calculates the score for that organization, including the reasons for the score.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a block diagram illustrating a non-limiting exemplary questionnaire format in accordance with some embodiments of the present invention;

Figure 1:
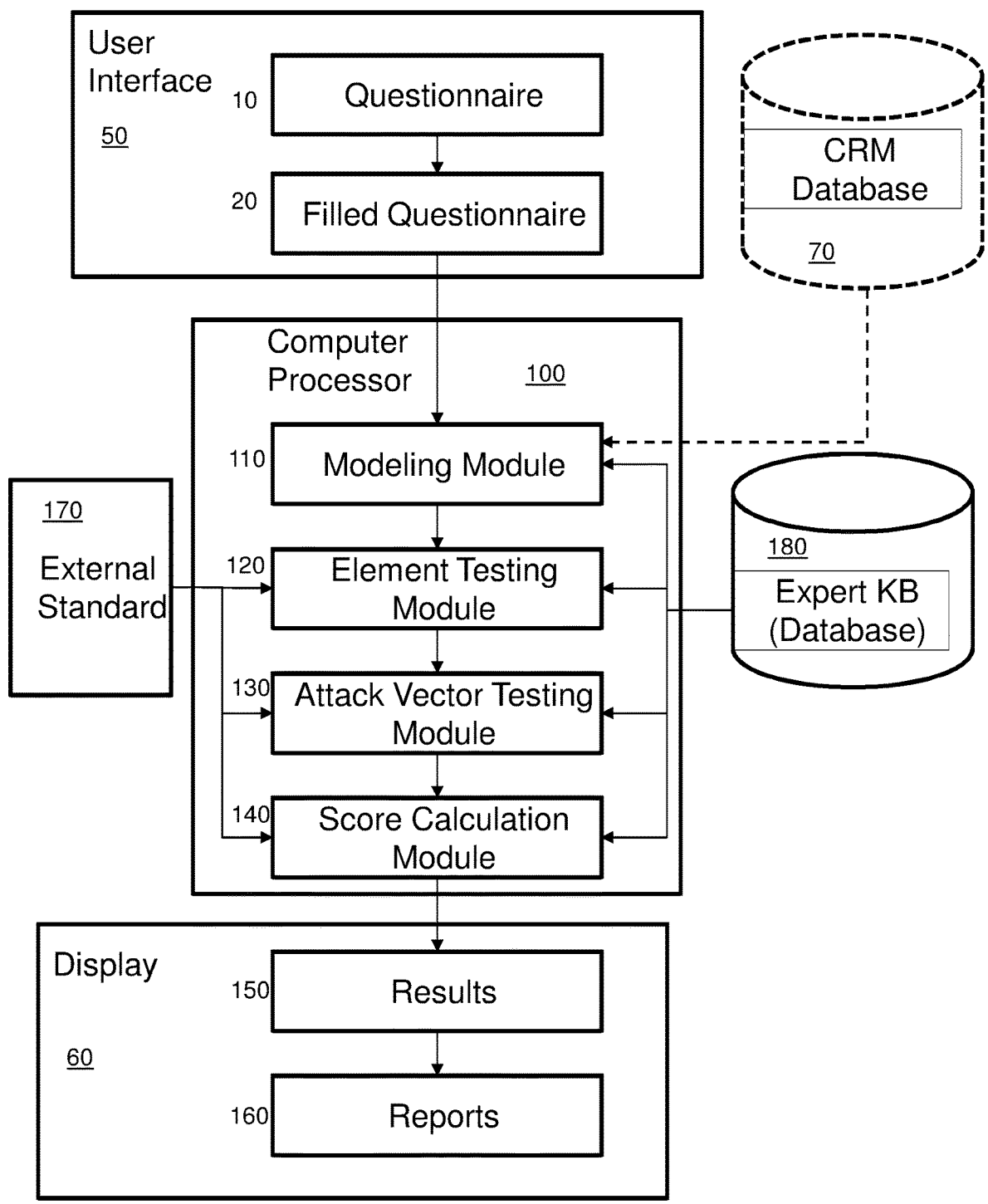
FIG. 1 is a high level block diagram illustrating a non-limiting exemplary system in accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

According to some embodiments of the present invention, a system of determining a readiness of a computerized network against denial of service (DoS) attacks is provided herein. The system may include the following components: a user interface configured to obtain responses to a questionnaire including one or more questions directed to properties characterizing the computerized network; a knowledge base (a database) containing a plurality of rules taking into account DDoS risks and best practice of how to avoid them; and a computer processor configured to analyze the responses using the database and determine a readiness of the computerized network against DDoS attacks, based on the analysis.

FIG. 1 is a high level block diagram illustrating a non-limiting exemplary system in accordance with some embodiments of the present invention. A system of determining a readiness of a computerized network against DDoS attacks is provided herein. The system may include a user interface 50 configured to obtain responses to a questionnaire 10 including one or more questions directed to properties characterizing the computerized network. The system may further include a computer processor 100 configured to analyze the filled-in questionnaire 20 (or alternatively the same data derived without questionnaire via direct access to databases of the organization). The analysis may be carried out possibly by employing a modeling module 110, an element testing module 120, an attack vector testing module 130, and a score calculation module 140, all implemented as software modules on a computer processor 100, using a knowledge base 180 containing a plurality of rules taking into account DDoS risks and best practice; and determining a readiness of the computerized network against DDoS attacks, based on the analysis wherein the output of the system may include results 150 and reports 160 or both, which can be then presented on display 60. In an optional embodiment, the data relating to the questionnaire may be obtained automatically by deriving it from various databases of the organization such as customer relationship management (CRM) database 60. In yet another embodiment, element testing module 120 carries out the analysis based on an external standard 170 of best practice rules and DDoS countermeasures.

The Questionnaire

FIG. 2 is a block diagram illustrating a non-limiting exemplary questionnaire format 200 in accordance with some embodiments of the present invention. The questionnaire is intended to be answered by a user ('User'). By answering these questions, the User provides information about the organization. The user may be an organization employee or consultant and has access to the organization services architecture. It is assumed that the User has reasonable intimacy with the Organization's network, service and procedures; however, the User is not assumed to be a DDoS expert.

In accordance with some embodiments of the present invention, the questions in the questionnaire extract relevant information from the User regarding the relevant organization, and have the following properties. The questions ask for data that the User is assumed to possess and is capable of answering. The questions are asking for information that is directly or indirectly related to the ability of an organization to withstand DDoS attacks.

In accordance with some embodiments of the present invention, the DRSES may have different products (referred herein as 'DRSES Products'). The difference between one product to another stems from the number of questions and number of options each question has. A basic version ("Basic Product", representing any version that is relatively more basic, not necessarily a specific single version) shall typically have small amount of questions and an advanced version ("Advanced Product", representing any version that is relatively more advanced, not necessarily a specific single version) will have more questions. The basic version is easier to fill: it requires less time to fill and less knowledge. The Advanced Product, on other hand, can produce more accurate output.

According to some embodiments of the present invention, the Questionnaire may contain the following type of questions in a non-limiting manner: Services the organization poses including their capacity; Services location (data center or cloud); Internet pipe size; Network elements, vendor, capacity and mitigation prosperities More questions may be directed to the existence of security network elements such as firewall, Web Application Firewall (WAF), DDoS mitigation appliance, ISP based DDoS protection, cloud-based DDoS protection and more. Questions that collect the properties of the network elements such as the vendor and model.

Further questions may relate to configuration actions, questions regarding the configuration actions of the existing network elements and services. For example, if the DDoS features were enabled and proofed, Human capacities (education, training) relating to the DDoS education level of the organization IT including the network operation center (NOC) and security operation center (SOC) teams and what kind of procedures do they hold for the event of a DDoS attack.

Finally, some questions may relate to Risk factors (country, vertical) relating to the additional external risk factors such as country and vertical.

Figure 3:
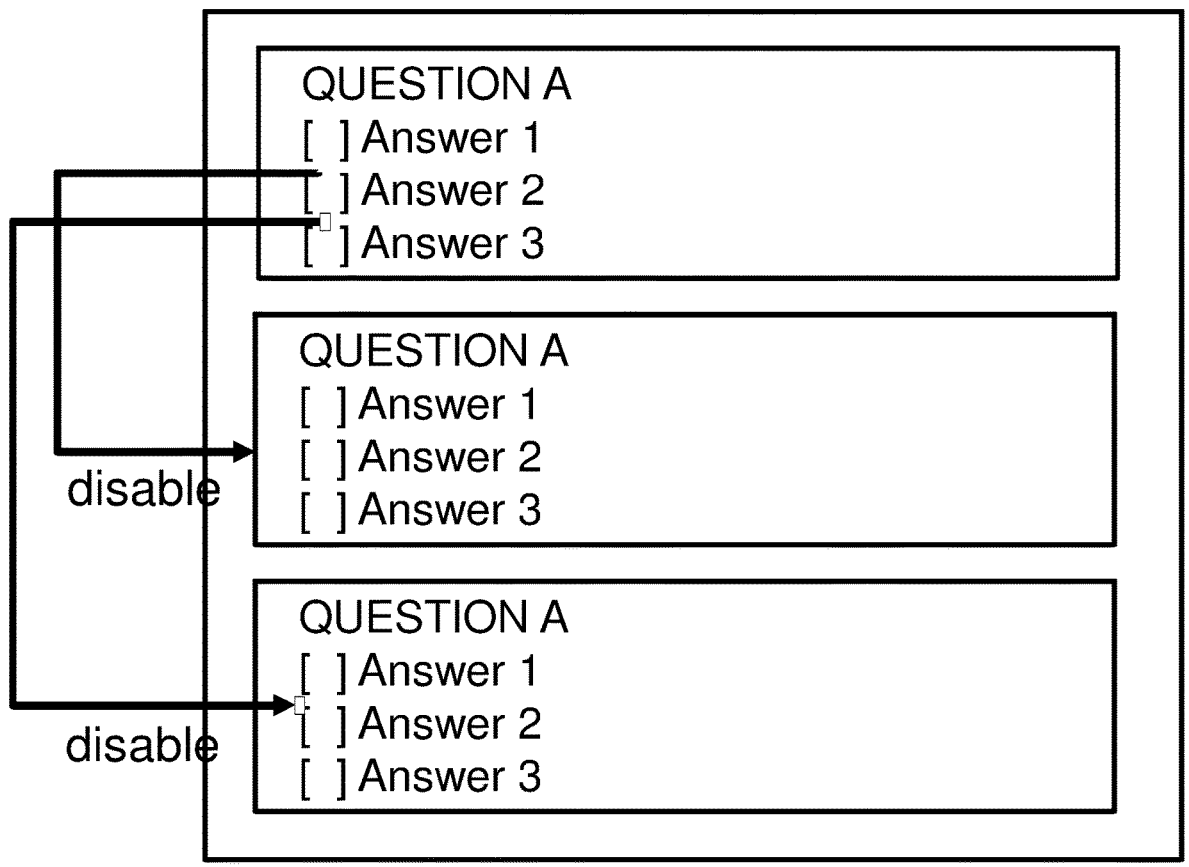
FIG. 3 is a block diagram illustrating another non-limiting exemplary questionnaire format in accordance with some embodiments of the present invention.

FIG. 3 is a block diagram illustrating another non-limiting exemplary questionnaire format 300 in accordance with some embodiments of the present invention. Questionnaire 300 may present a list of questions wherein each question has a list of answers that are relevant. The questions may have interconnected relationship between them. For example, filling a specific answer in question A will make the entire question B irrelevant (or alternatively make some of its answers irrelevant). Each answer in each question can indicate that another question or another answer is disabled, which means that in a case that this answer has been marked by the user, then the disabled question or disabled answer will not be presented again.

The Disabled data that fills the questionnaire is part of the expert knowledge and can take on of two forms: Static data—the data is provided a prior as static explicit relations; and Dynamic—a function is representing this data and for each answer the function is invoked and in real-time calculates the Disabled list.

The Filled Questionnaire is the Questionnaire after the User had filled all the answers.

Figure 4:
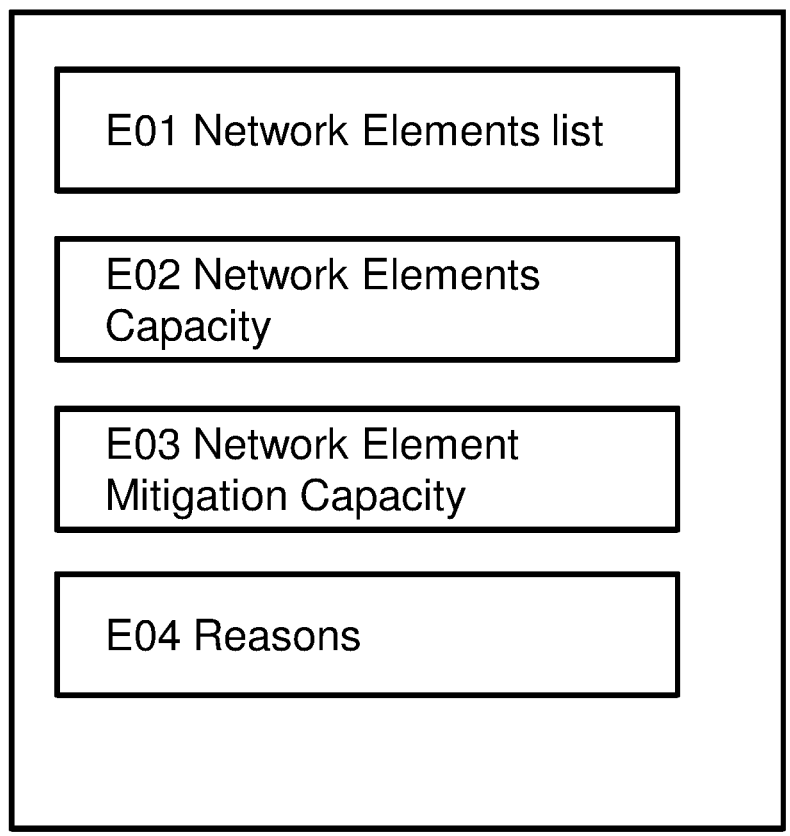
FIG. 4 is a block diagram illustrating a non-limiting exemplary knowledge base in accordance with some embodiments of the present invention.

FIG. 4 is a block diagram illustrating non-limiting exemplary expert knowledge base (KB) 400 in accordance with some embodiments of the present invention. The expert KB 400 contains information revolving DDoS attack and their mitigation. The information includes facts and relationships. In the following section, the information types will be described. The actual data is not part of the algorithm and is ever changing due to technology changes and changes in attack types. For example, the expert knowledge contains relevant information about web service, DNS service, internet pipe, firewall, web application firewall (WAF), DDoS mitigation appliance, DDoS mitigation cloud service, access control list (ACL), IPS-based DDoS mitigation service.

Vendors—each element will further include a list of vendors that are manufacturing the element, and also model type.

Generic Element is a network element not associated with a particular vendor, for example, 'firewall' is a Generic Element. Generic Element can be assigned with properties that represent a typical case.

In accordance with some embodiments of the present invention, each network element may have maximal throughput in respect to network traffic and DDoS attacks ('Network Element Capacity' or in short 'Capacity'). The limits are measures on the following parameters (non-exclusive list): BPS (bits per second); PPS (packets per second); TPS (transactions per second) also referred as RPS (requests per second); Concurrent connections; and those parameters will be referred as 'Capacity Parameters'.

In accordance with some embodiments of the present invention, a network element a generic firewall can handle 10 Gbps, 1 million PPS 10,000 TPS and 100,000 concurrent connections.

The following factors can affect each of the capacities: configuration—if a Network Element is not configured its capacity can be lower; and Mitigation Capacity—in accordance with some embodiments of the present invention, some network elements have DDoS mitigation capacity. This Mitigation Capacity is completely independent of Network Element Capacity.

The Mitigation Capacity parameters may be based on the Capacity Parameters defined above. For example: "A standard DDoS mitigation appliance has the mitigation capacity of 10 Gigabits per second, 10 million packet per second and 500,000 transactions per second."

The DRSES system does not only provide a test simulation and results in the technical form of pass/fail value per each attack vector. In addition, it provides the reasons for failure (as well as reason for successes). It also provides a recommendation, which is another layer based on the reasons.

In accordance with some embodiments of the present invention, a 'Reason' is a data structure that represents an individual reason. It may include the following values, in a non-exclusive, illustrative list: Code—a unique code each reason is associated with; Text—a text that explains to the User in plain English the reason for failure for a specific Attack Vector (in general or with respect to a specific Network Element); Reason Status—the appropriate status of a reason (MITG,FAIL,NONE,TRAV) as will be explained in detail hereinafter; and Reason Category—the family type of a reason as defined in Table (1) below. This serves later on to prioritize reasons.

TABLE (1)

| Order | Reason Type | Reason Category |
|---|---|---|
| 10 | — | GENERIC |
| 9 | MITG | MITG |
| 7 | TRAV | ABSORB |
| 6 | TRAV | BYPASS_HIGH |
| 5 | TRAV | BYPASS_MED |
| 4 | TRAV | BYPASS_LOW |
| 3 | FAIL | FAIL |
| 1 | TRAV | TRAV |
| 0 | NONE | NONE |

According to some embodiments of the present invention, 'Reasons' is part of the Expert KB and is referred as 'Reasons'. Reasons may be either in a basic form ('Basic Reason') or an advanced form ('Advanced Reasons'). Basic Reasons is defined by a table that maps each Network Element to a respective Element Status. The table holds a Reason for each combination. Advanced Reasons provide further details as to why a specific Network Element is in a specified Element Status.

In accordance with some embodiments of the present invention, and by way of example, in a case that the Network Element is an 'Internet Pipe' and in case that the Element Status is "FAI"L, the reason indicates that "the internet pipe failed against a specific Attack Vector." The Advanced Reasons may provide further details on top of the Basic Reason and may indicate different types of failure reasons. For example, the failure can be because the internet pipe size is smaller than the Attack Vector size.

In accordance with some embodiments of the present invention, the Modeling may create a representation of the Organization network and service. This modeling is referred to herein as 'Testing Model' and includes a data structure that describes the architecture of all services and network elements in the organization.

Figure 5:
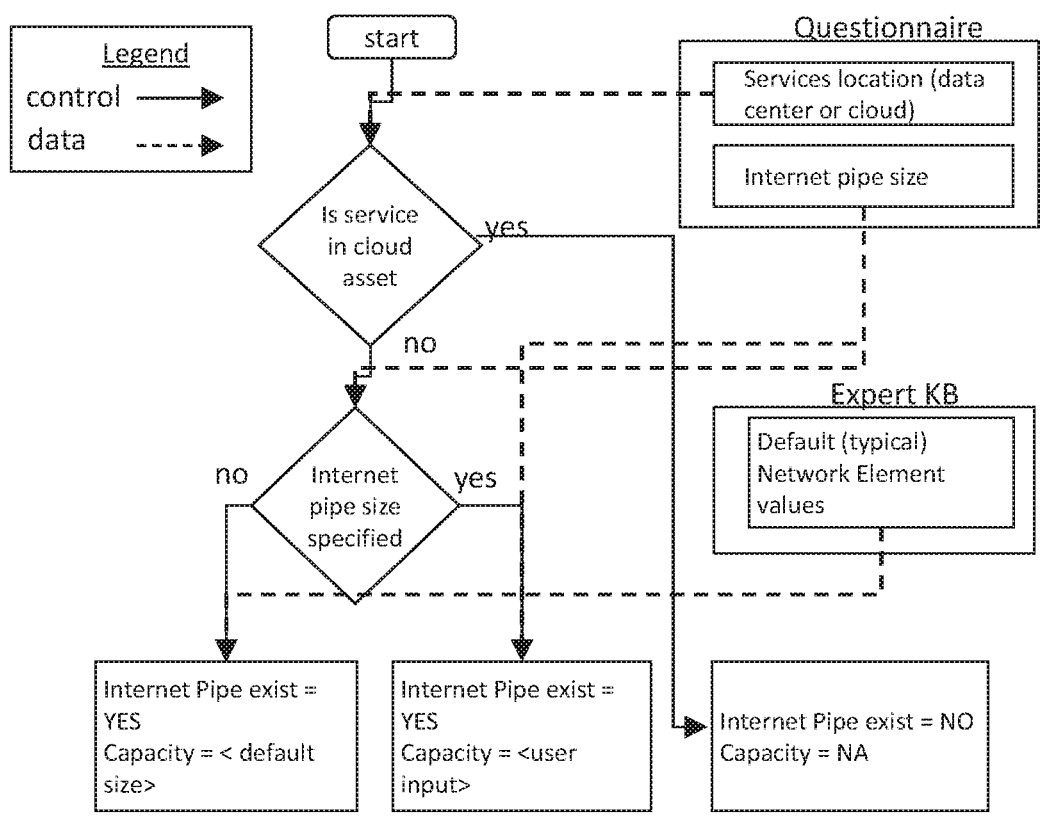
FIG. 5 is a high level flowchart illustrating a non-limiting exemplary method in accordance with some embodiments of the present invention.

According to some embodiments of the present invention, each network element is populated in a different manner. FIG. 5 illustrates a flowchart 500 which demonstrates how the Internet Pipe size is populated. Populating the Internet Pipe requires the following parameters to be set: Exist ('yes' or 'no') and Size (specified in Mbps). A prerequisite is that the service is located on cloud resources or in the organization data center. The necessary information required to check the prerequisite is obtained via the questionnaire, specifically from the 'Services location (data center or cloud)' questions.

According to some embodiments of the present invention, if the service is located on cloud resources, then the Testing Model is populated as follows: Internet pipe Exist=No, Internet Pipe Size=N/A.

According to some embodiments of the present invention, if the service is located at the Organization data center, then the next condition is if the internet pipe size is specified. This value arrives for the Questionnaire specifically from the 'Internet pipe size' questionnaire.

According to some embodiments of the present invention, if the condition has a positive answer (internet pipe size is specified), then the Testing Model is populated as follows: Internet pipe=Exist, and Internet Pipe Size=<value is taken from the Questionnaires>.

According to some embodiments of the present invention, if the condition is false (internet pipe size not specified), then the Testing Model is populated as follows: Internet pipe=Exist, Internet Pipe Size=<value is taken from the Expert KB, specifically from the 'Default (typical) Network Element values'>.

Elements existence is based on the questionnaire on the following two questions types: Services the organization poses including capacity, and Network elements, vendor, capacity and mitigation prosperities.

Figure 6:
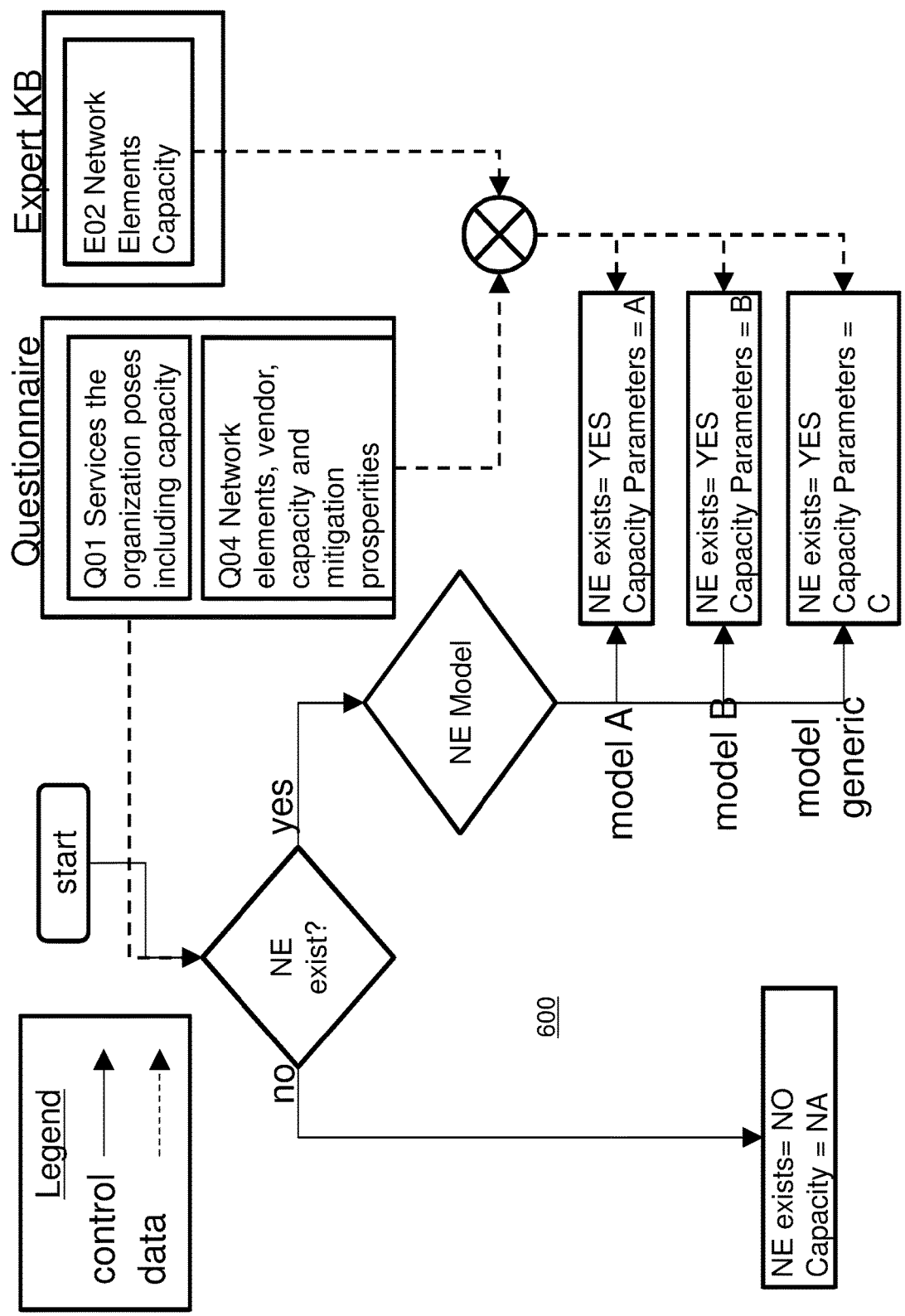
FIG. 6 is a high level flowchart illustrating a non-limiting exemplary method in accordance with some embodiments of the present invention.

FIG. 6 is a flowchart 600 illustrating how populating the network elements is carried out according to some embodiments of the present invention. In a case that a Network Element does not exist, the fact that it does not exist is also an important piece of information and is marked in the Test Model. If the Network element exists, it is represented as existing in the model.

It should be hereby noted that typically it will occur only in Advanced Versions where the Questionnaire will ask the User for specific Network Element Capacity. If the information (Network Element Capacity) is not provided directly, then the default Network Element values will be used, or if Network Element vendor is specified and/or model is specified, the related Network Element Capacity will be assigned (as specified in the Expert KB).

Populating Mitigation Capacities

According to some embodiments of the present invention, Mitigation Capacity is a property that will be assigned to only existing Network Elements. Furthermore, it will be assigned only to Network Elements that have DDoS mitigation capabilities (as defined the 'E03 Network Element Mitigation Capacity'). The Mitigation Capacities are assigned to the relevant Network Elements in a very similar manner to Network Element Capacity assignment process. In the case that they are explicitly specified by the User, they are populated by the Filled Questionnaire input directly.

According to some embodiments of the present invention, in the (typical) case where they are not specified explicitly, they are taken from the Expert KB based on the type of Network Element and, where applicable, are further based on vendor and model type. In addition, the Expert KB may narrow down the Mitigation Capacities to the specific Attack Vectors list only.

In this case, the Mitigation Capacity can be relevant to a specific Attack Vector list but will not be relevant for another Attack Vector list, in which case it will either be not relevant at all or be relevant but with different values. The inputs that determine this (that a Mitigation Capacity of a Network Element is limited to only specified Attack Vectors) are as follows:

According to some embodiments of the present invention, in the Configuration—the User had specified (in the Filled Questionnaire under 'Q05 Configuration actions') that a certain feature was not configured or was not configured well or there is reason to believe that it is not configured well by deduction. In this case, all related Attack Vectors will not mitigated and therefore the Testing Model will include the appropriate representation of this limitation.

Figure 7:
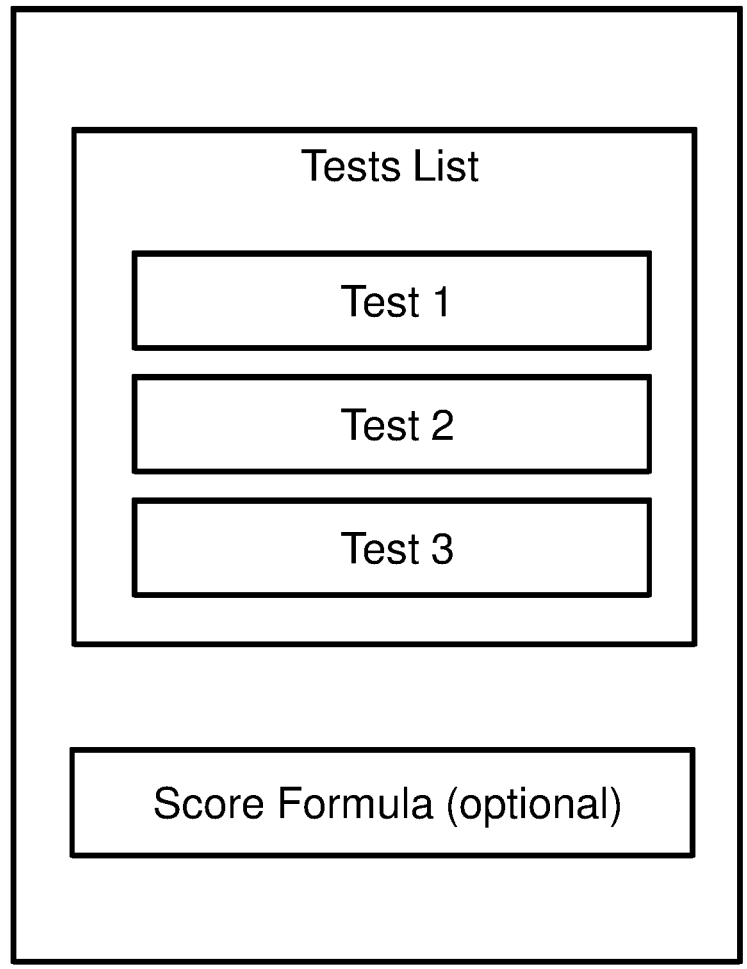
FIG. 7 is a block diagram illustrating a non-limiting exemplary external standard in accordance with some embodiments of the present invention.

FIG. 7 is a diagram illustrating how DRSES is relying on an external standard ('External Standard') 700 that has the following properties. The standard is comprised of a list of individual tests ('Test'), and where each test describes the details of a security DDoS attack.

The standard may also include a methodology or a formula to calculate the final score ('Score Formula'). This methodology receives as an input the result of the test and, based on the calculation as an output, a final score.

According to some embodiments of the present invention, the aforementioned input is referred as a static input because it does not change in each Check ("Check" is defined as a single execution of the entire algorithm for an individual organization), although the standard can change from time to time.

The standard is currently used by the system is referred as 'DDoS Resiliency Score' ('DRS') (http://www.ddosresiliencyscore.org/).

The following are two non-limiting examples of a Tests from the DRS standard illustrating the format:

'111001 SYN Flood: vol_pps=10K'—A DDoS SYN flood at a rate of 10,000 packets per second.

'151002 HTTP GET Flood: vol_tps=1K'—A DDoS HTTP flood at a rate of 1,000 transaction per second.

According to some embodiments of the present invention, the Tests that are defined by the DRS are called Attack Vectors. An Attack Vector is an accepted name to describe an individual attack that is characterized by its type and other properties.

For the sake of simplicity, the term 'Attack Vector' will be used to describe a Test, although other External DDoS Evaluation Standard may be based on which Tests are not represented by Attack Vectors.

Element Testing

According to some embodiments of the present invention, this phase is referred to as 'Element Testing', and the goal is to make a validation of each Test (Attack Vector) against each Network Element. The output of this validation is how the Network Element will behave under the Attack Vector. This output is referred as 'Element Status'. There are four categories of responses.

It should be noted herein that the four categories will later play important role in defining the overall success or failure of the attack vector, as will be seen in the next phase.

1. NONE—the Network Element does not exist, and therefore the Attack Vector does not affect it, regardless of course of the Attack Vector;
2. MITG—the Network Element has relevant and configured Mitigation Capacity against this Attack Vector and therefore will mitigate it;
3. TRAV—The Network Element has relevant Network Element Capacity bigger than the Attack Vector, and therefore the Attack Vector will traverse the Network Element. for example, a 100 Mbps UDP flood will traverse (TRAV) an internet pipe of 200 Mbps since it will not fail it nor will it mitigate it; and
4. FAIL—the Network Element will fail against the attack vector For example, a 400 Mbps UDP flood will fail (FAIL) an internet pipe of 200 Mbps as it will cause pipe saturation.

Figure 8:
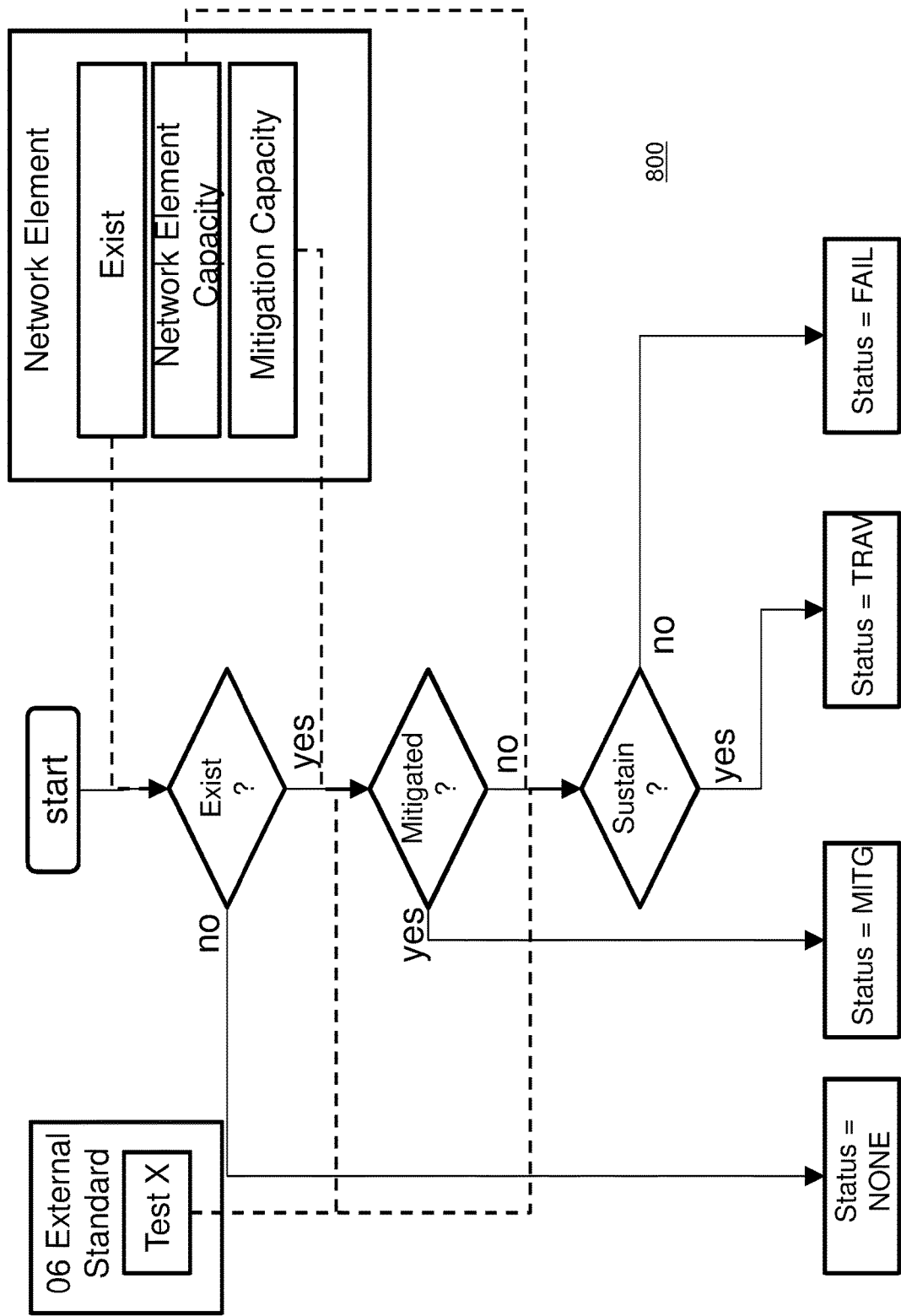
FIG. 8 is a high level flowchart illustrating a non-limiting exemplary method in accordance with some embodiments of the present invention.

FIG. 8 is a flowchart illustrating an aspect of the method in accordance with some embodiments of the present invention. First, the Reasons are assigned for all types of outputs and can describe either the reason for succeeding in mitigating or at least withstanding an Attack Vector or reason for failing it. Then, the Element Testing is being performed for, in a non-limiting example, the following entities: Every Test (or Attack Vector), Every Network Element. The properties of each Network Element to be tested are taken form the Test Model. In a case that the Network Element does not exist, then the Element Status is indicated as 'NONE'. Otherwise, if the Network Element relevant Mitigation Capacities are higher than Attack Vector relevant properties, then the Element Status is indicated as 'MITG'. Otherwise, in a case that the Network Element relevant Network Element Capacity is higher than the Attack Vector relevant properties, then Element Status is assigned with 'TRAV'. Otherwise, in the case that Element Status=FAIL, the meaning is that the Network Element will fail to this Attack Vector.

Element Reason

According to some embodiments of the present invention, once the Element Status is defined, the Element Reason is being assigned as well based on the Reasons table in the Expert KB that is preassigned with a Basic Reason for each Network Element and each Status. This value will be assigned to each Element Status being a status indicating how the Network Element behaves under the Attack Vector. It should be noted that, in some cases, the Basic Reason will be further refined to Advanced Reason based on some specific condition arising from the specific attack vector and the properties of the specific Network Element. For example, a general failure of a network element can be divided into failure due to lack of capacity or failure due to lack of configuration. Those are different and unique Advanced Reasons.

Attack Vector Testing

According to some embodiments of the present invention, the input of this phase is outcome of each Attack Vector against each Network Element individually. The goal or output of this phase is to evaluate, for each Attack Vector, if its output will pass or fail, that means if the attack vector will cause denial or service or not. The idea is to accumulate the results of the Element Statuses together as defining the following algorithm.

Definitions

Figure 9:
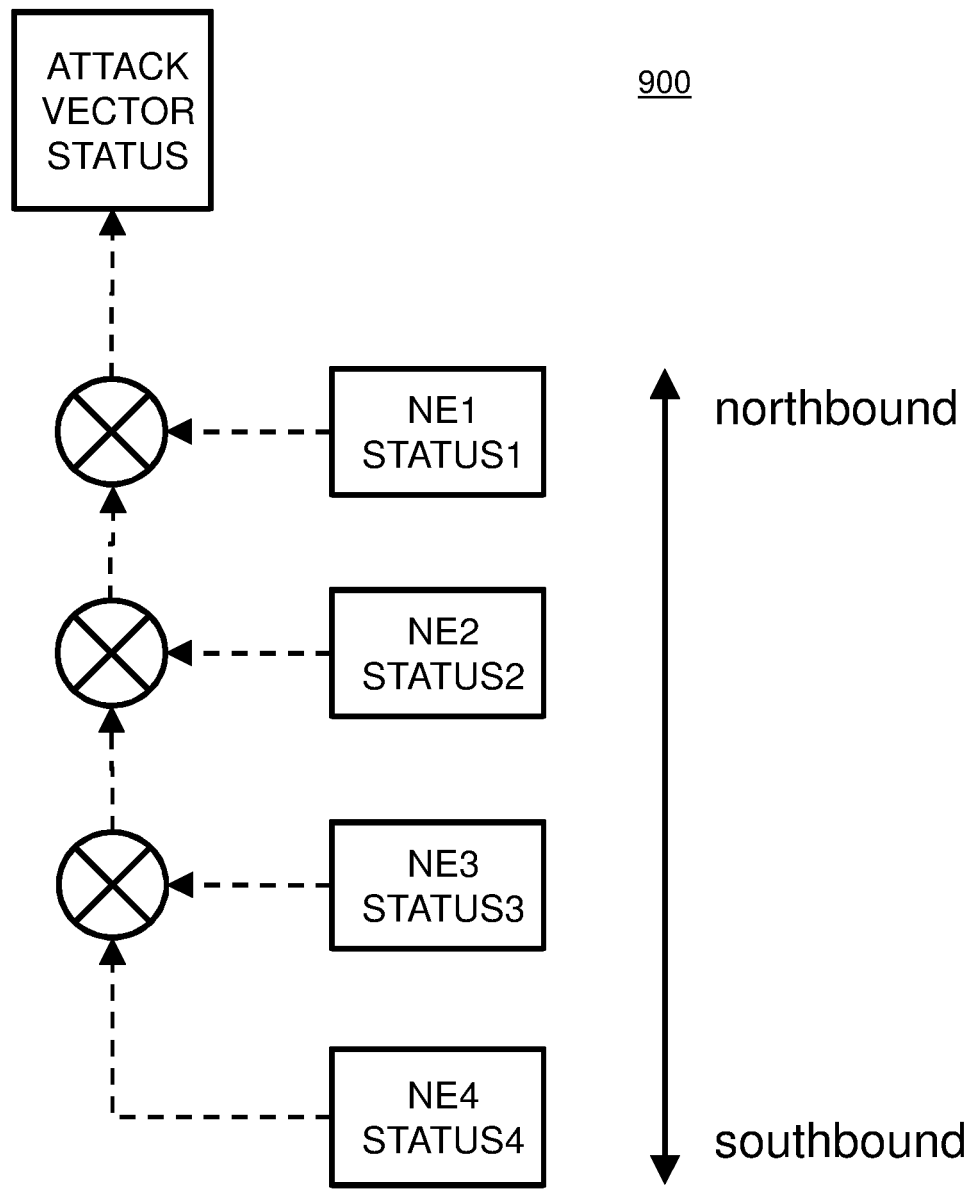
FIG. 9 is a high level flowchart illustrating a non-limiting exemplary method in accordance with some embodiments of the present invention.

FIG. 9 is a block diagram illustrating an aspect of the system in accordance with some embodiments of the present invention. As will be defined hereinafter, in a logic space 900, 'Northbound' and 'Southbound' represent the location directions of network elements, where Northbound represents Network Elements that are closer to the Internet, and Southbound represent Network Elements that are close to the internal network and specifically to the services location. (It should be noted: these terms are common concepts in Internet Security). For example, typically the following Network Elements will be ordered as follow: internet pipe, router, firewall, WAF, server, listed form the most Northbound (internet pipe) element to the most Southbound one (server).

Let the 'Network Element Location' System be a numbering system that assigns a number, a sequential number, to each Network Element in the Testing Model where the most Northbound Element is assigned with the value 1, the next Network Element assigned as 2, and so on. Let 'Network Element Location' be the number assigned to each Network Element.

According to some embodiments of the present invention, the Network Element location is predefined by an expert and each Network Element is assigned with its location a priori to the Filled Questionnaire. Let 'Last Network Element Location' be a number that is equal to the "last" Network Element, namely the Southeastest Network Element Location. Let 'Attack Vector Status' be a single value per each Attack Vector that accumulates all the Element Statuses into a single value. Attack Vector Status, like Element Status, can be either NONE, MITG, TRAV or FAIL. NONE=the element does not exist (absent) from the model.

The attack vector result is illustrated by the following Table (2) below:

TABLE (2)

| Attack Vector Status (input) | Attack Vector Result (status) |
| --- | --- |
| NONE | N/A (not possible) |
| MITG | PASS |
| TRAV | PASS |
| FAIL | NOT_PASSED |

Figure 10:
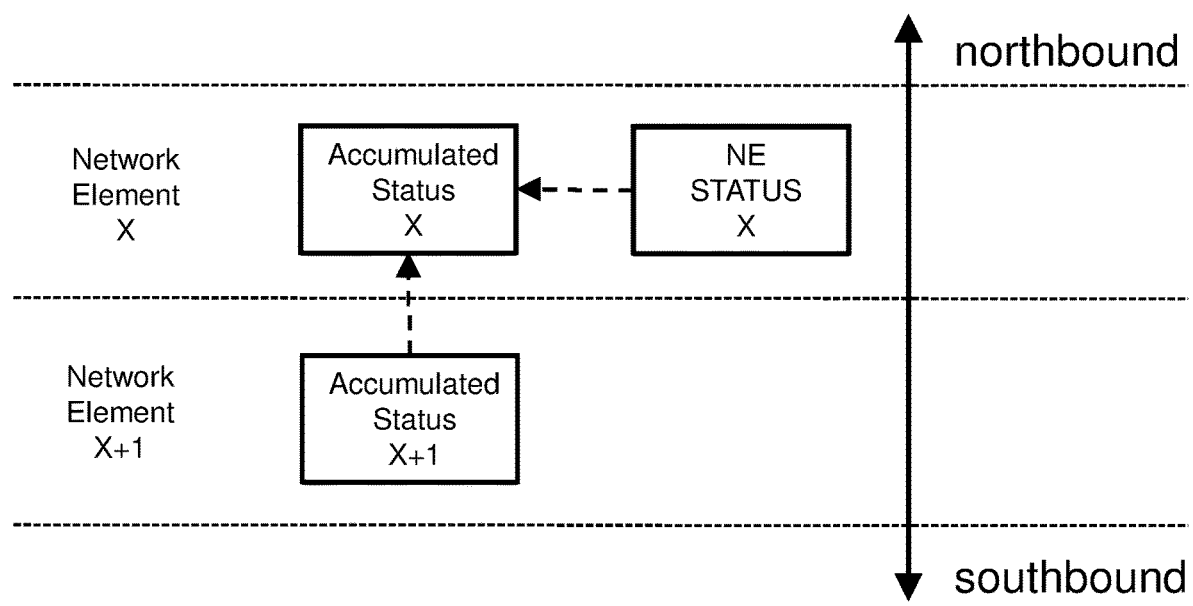
FIG. 10 is a block diagram illustrating another aspect of a system in accordance with some embodiments of the present invention.
Figure 11:
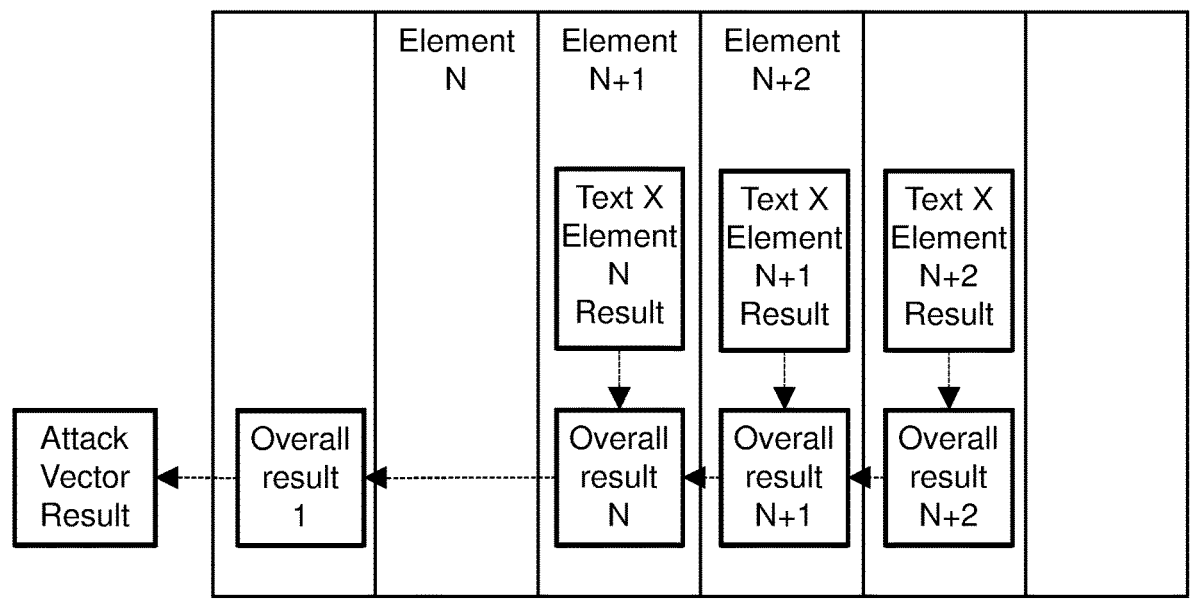
FIG. 11 is a block diagram illustrating another aspect accordance with some embodiments of the present invention.

FIG. 10 is a block diagram illustrating an aspect of the system in accordance with some embodiments of the present invention. FIG. 11 is a block diagram illustrating an attack vector simulation 1100 in accordance with some embodiments of the present invention in a generalized case. In logic spaces 1000 and 1100, a so-called 'Attack Vector Accumulated Status', or in short 'Accumulated Status', represents the Attack Vector Status at a specific Network Element Location. The Accumulated Status at location N represents an accumulation of the Network Element Status N, N+1 and onward (or "southboundward") and does include the statuses of Network Elements N−1 and onward (or "northboundward").

Let 'Attack Vector Result' represent if an Attack Vector passed ('PASS') or failed ('NOT_PASSED').

According to some embodiments of the present invention, following is a non-limiting implementation of the algorithm executed by some embodiments of the present invention:

The following function illustrated by Table (3) below defines the Accumulated Reason. The Accumulated Reason propagation, like the Accumulated Status propagation, is defined by the Statuses. The Accumulated Reason at location N is defined by the previous Accumulated Status (N+1) and the current Network Status (N).

BEST_REASON_in some cases, the Statuses are agnostic to which Reason should propagate, and in this case, it is defined by the more prioritized Reason. The order of Reason is defined by the Reason Category.

TABLE (3)

| Accumulated Status N + 1 (input) | Network Element Status N (input) | Accumulated Status N (output) | Accumulated Reason N (output) |
|---|---|---|---|
| MITG | MITG | MITG | Network Element Reason N |
| MITG | FAIL | MITG | Network Element Reason N |
| MITG | TRAV | MITG | Network Element Reason N |
| MITG | NONE | MITG | Network Element Reason N |
| FAIL | MITG | FAIL | Network Element Reason N |
| FAIL | FAIL | FAIL | Network Element Reason N |
| FAIL | TRAV | FAIL | Network Element Reason N |
| FAIL | NONE | FAIL | Network Element Reason N |
| TRAV | MITG | MITG | Accumulated Reason N + 1 |
| TRAV | FAIL | FAIL | BEST_REASON |
| TRAV | TRAV | TRAV | BEST_REASON |
| TRAV | NONE | TRAV | Network Element Reason N |
| NONE | MITG | MITG | Accumulated Reason N + 1 |
| NONE | FAIL | FAIL | Accumulated Reason N + 1 |
| NONE | TRAV | TRAV | Accumulated Reason N + 1 |
| NONE | NONE | NONE | Accumulated Reason N + 1 |

Reasons

According to some embodiments of the present invention, and as will be defined herein, 'Attack Vector Reason for Failure' is an equivalent term to 'Attack Vector Status', where the former relates to 'Reason of Failure' and the latter to 'Status'.

In a similar manner, let 'Accumulated Reason for Failure' be the equivalent concepts of 'Accumulated Status'.

The following function defines the Accumulated Reason. The Accumulated Reason propagation, like the Accumulated Status propagation is defined by the Statuses of the next Accumulated Status (N+1) and the current Network Status (N) as in aforementioned table (2). It should be noted, however, that it is not defined by the Reason itself, let alone the case defined below.

BEST_REASON—in some cases, the Statuses are agnostic to which Reason should propagate, and in this it is defined by the more prioritized Reason.

Stop Condition

Let Accumulated Reason at location of Last Network Element Location be equal to Network Element Reason at location N.

Score Calculation

The score calculation is defined by the External Standard, and so embodiments of the present invention do not affect the scoring scheme itself.

Result

The result is an output or a phase that is taking all the calculated information that was executed in the previous steps and arranging it the following format: DRS Score and Analysis, Score, The actual score (dynamic number), Visual—dynamic visual that shows the score near the graph, Explanation—dynamic text that explain the score in an 'executive summary' manner, How is the Score Calculated—static text, and a Gap Analysis According to some embodiments of the present invention, an addition value which represents the recommended score for the Organization (based on vertical, country, and the like) may be included in the result.

In addition to an exact figure, there is a range. For example, if the recommendation for this organization will be 5, the range will typically be 4.5-5.5. There is a comparison called 'Gap Analysis' that shows the differences between this figure and the Score.

Technical Analysis—shows the result of each and every Attack Vector including Attack Vector Result. For example, the following features may be included: Reasons—explain all the reason, Reason for failure, Reason for success, and Recommendation being a List of recommendations.

External Standard Results

According to some embodiments of the present invention, the result is format is defined by, and only by, the specific External Standard used which is currently the DRS standard. For example, the results include a value for each Attack Vector: Pass or Fail; and a Score that can range from 0 to 7.

Metadata

According to some embodiments of the present invention, the metadata may be defined as outputs of the DRSES Algorithm that are not defined by the standard. They include the following fields: Reason for Failure—a description of why a Test failed or receive some other negative value, Reason for Success—same as Reason for ailure' but for test that pass or received some other positive value, Recommendation—a description of how to improve a specific Test result or the result of the entire Check, Explanation—A description that explain in plain words what the test result means, The metadata is expected to grow gradually over time.

Report

Figure 12:
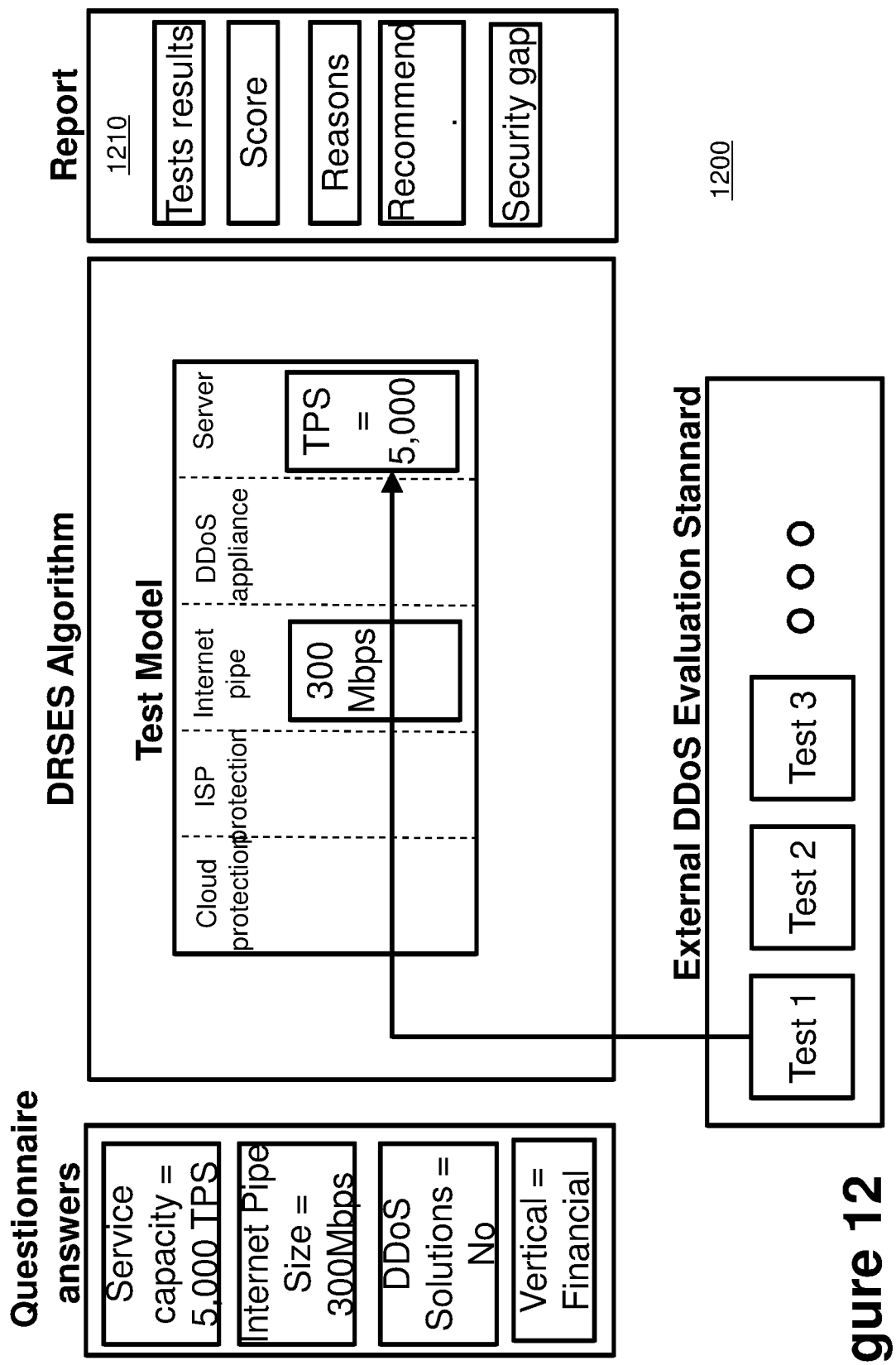
FIG. 12 is a block diagram illustrating another aspect accordance with some embodiments of the present invention.

FIG. 12 is a block diagram illustrating an aspect of the system 1200 in accordance with some embodiments of the present invention, and demonstrates a holistic view of the system starting for the Questionnaire, that goes into generating the Test Model, using the External Standard as an input for Attack Vectors, to produce the results including Test (Attack Vector) Results and Metadata including Reasons, Recommendations, and security gaps. The results are then compiled into a report. According to some embodiments of the present invention, a so-called 'Report' 1210 is then compiled into a presentable report such as PDF document or HTML. The test results ('Result') represent the outcome of the test. The Result is an internal input in the sense that it is not the yet the output the User receives. It is comprised of two parts: the 'External Standard Results' and the 'Metadata'. The result is calculated by the DRSES algorithm at each Check.

Figure 13:
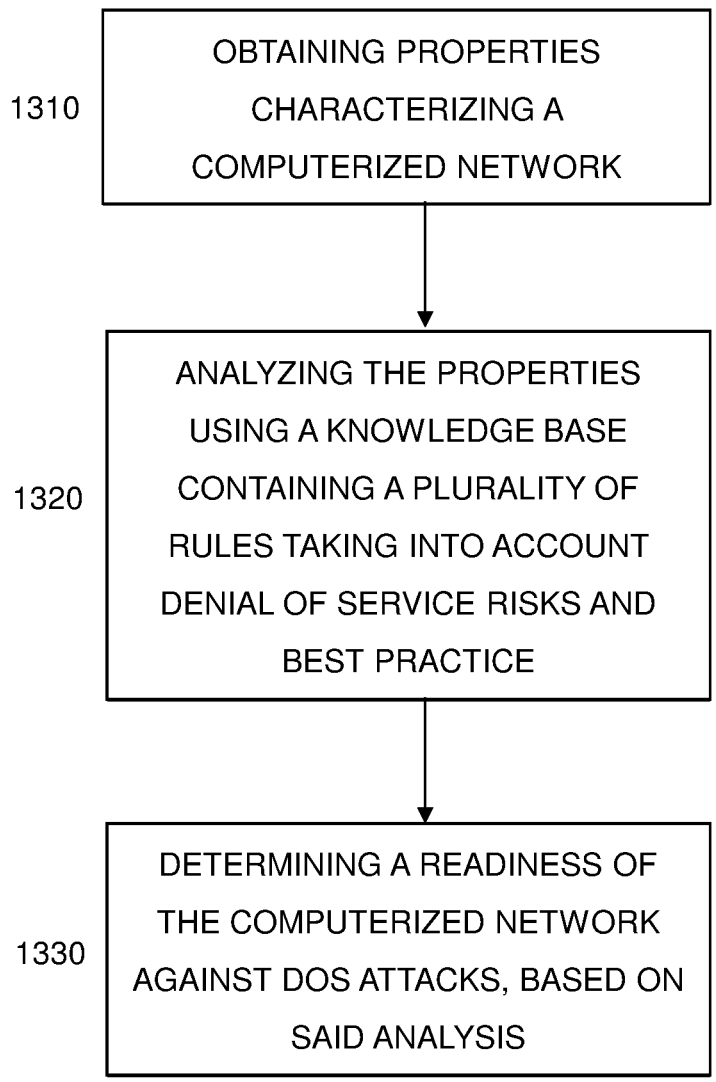
FIG. 13 is a high level flowchart illustrating another non-limiting exemplary method in accordance with some embodiments of the present invention.

By way of summary, in a generalized manner, FIG. 13 illustrates an essence of the method in accordance with some embodiments of the present invention. Method 1300 of determining a readiness of a computerized network against DDoS attacks, includes the following steps: obtaining properties characterizing the computerized network 1310; analyzing the properties using a knowledge base containing a plurality of rules taking into account DDoS risks and best practice related thereto 1320; and determining a readiness of the computerized network against DDoS attacks, based on the analysis 1330.

In accordance with some embodiments of the present invention, method 1300 may be implemented by a non-transitory computer readable medium that includes a set of instructions that, when executed, cause the least one computer processor to: obtain properties characterizing the computerized network; analyze the properties using a knowledge base containing a plurality of rules taking into account DDoS risks and best practice related thereto; and determine a readiness of the computerized network against DDoS attacks, based on the analysis.

In order to implement the method according to some embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory based solid state disks (SSDs) and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples.

It is to be understood that the details set forth herein do not construe a limitation to an application of the invention. Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of determining a level of readiness of a computerized network against distributed denial of service (DDoS) attacks for assisting an organization, the method comprising:
    obtaining properties characterizing at least some of the network elements and services of said computerized network;
    generating a network model which includes a data structure that describes the architecture of at least some of the services and the network elements in the organization;
    analyzing said properties, by applying a plurality of DDoS attack vectors to said network model, using a knowledge base containing a plurality of rules taking into account DDoS risks and best practice suitable to mitigate said DDoS risks, to yield a technical analysis, wherein said technical analysis comprises for at least some of the network elements and services, an indication about an outcome of at least some of the DDoS attack vectors thereon; and
    determining a level of readiness of said computerized network against DDoS attacks, based on said technical analysis, wherein the level of readiness is given by a score that is calculated in view of an external standard that describes a range of scores.

2. The method according to claim 1, wherein the obtaining of the properties comprises obtaining responses to a questionnaire including one or more questions related to said computerized network.

3. The method according to claim 1, wherein the obtaining of the properties comprises deriving said properties automatically from databases of the organization associated with said computerized network.

4. The method according to claim 1, wherein the readiness comprises score per attributes directed to predefined risks.

5. The method according to claim 1, wherein the knowledge base comprises an inferential engine.

6. The method according to claim 1, wherein the knowledge base maps types of attacks to types of potential risks.

7. The method according to claim 1, wherein the readiness is relative to an external standard encompassing readiness of computerized networks against DDoS attacks.

8. A system for determining a level of readiness of a computerized network against distributed denial of service (DDoS) attacks for assisting an organization, the system comprising:
    an interface configured to obtain properties characterizing at least some of the network elements and services of said computerized network;
    a knowledge base containing a plurality of rules taking into account DDoS risks and best practice suitable to mitigate said DDoS risks; and a computer processor configured to:

generate a network model which includes a data structure that describes the architecture of at least some of the services and the network elements in the organization analyze said properties by applying a plurality of DDoS attack vectors to said network model, using said knowledge base containing a plurality of rules taking into account DDoS risks and best practice suitable to mitigate said DDoS risks, to yield a technical analysis, wherein said technical analysis comprises for at least some of the network elements and services, an indication about an outcome of at least some of the DDoS attack vectors thereon; and determine a level of readiness of said computerized network against DDoS attacks, based on said technical analysis, wherein the level of readiness is given by a score that is calculated in view of an external standard that describes a range of scores.

9. The system according to claim 8, wherein the obtaining of the properties comprises obtaining responses to a questionnaire including one or more questions related to said computerized network.

10. The system according to claim 8, wherein the obtaining of the properties comprises deriving said properties automatically from databases of the organization associated with said computerized network.

11. The system according to claim 9, wherein the questionnaire is tailored per DDoS properties of said computerized network.

12. The system according to claim 8, wherein the level of readiness comprises score per attributes directed to predefined risks.

13. The system according to claim 8, wherein the knowledge base comprises an inference engine.

14. The system according to claim 8, wherein the knowledge base maps types of attacks to types of potential risks.

15. The system according to claim 8, wherein the level of readiness is relative to an external standard encompassing readiness of computerized networks against DDoS attacks.

16. A non-transitory computer readable medium for determining a level of readiness of a computerized network against distributed denial of service (DDoS) attacks for assisting an organization, the computer readable medium comprising a set of instructions that when executed cause at least one computer processor to:

obtain properties characterizing at least some of the network elements and services of said computerized network;

generate a network model which includes a data structure that describes the architecture of at least some of the services and the network elements in the organization analyze said properties by applying a plurality of DDoS attack vectors to said network model, using said knowledge base containing a plurality of rules taking into account DDoS risks and best practice suitable to mitigate said DDoS risks, to yield a technical analysis, wherein said technical analysis comprises for at least some of the network elements and services, an indication about an outcome of at least some of the DDoS attack vectors thereon; and determine a level of readiness of said computerized network against DDoS attacks, based on said technical analysis, wherein the level of readiness is given by a score that is calculated in view of an external standard that describes a range of scores.

17. The non-transitory computer readable medium according to claim 16, wherein the obtaining of the properties comprises obtaining responses to a questionnaire including one or more questions related to said computerized network.

18. The non-transitory computer readable medium according to claim 16, wherein the obtaining of the properties comprises deriving said properties automatically from databases of the organization associated with said computerized network.

19. The non-transitory computer readable medium according to claim 18, wherein the questionnaire is tailored per DDoS properties of said computerized network.

* * * * *